INVENTORS
ROBERT W. WAGNER
DARALD A. FISCHER

ATTORNEY

INVENTORS
ROBERT W. WAGNER
DARALD A. FISCHER
BY
ATTORNEY

United States Patent Office 3,540,297
Patented Nov. 17, 1970

3,540,297
POWER TAKE-OFF
Robert W. Wagner, Ann Arbor, and Darald A. Fischer, Chelsea, Mich., assignors to Dana Corporation, Toledo, Ohio, a corporation of Virginia
Filed Sept. 12, 1968, Ser. No. 759,283
Int. Cl. F16h 37/00
U.S. Cl. 74—15.86                                    5 Claims

ABSTRACT OF THE DISCLOSURE

A power take-off assembly for connection to a live gear in a main transmission, the power take-off having a hydraulic connect-disconnect clutch for operating the power take-off and to facilitate ratio changes in the main transmission while the power take-off is being utilized.

This invention relates to power take-off assemblies employed in association with main power transmissions, and more particularly with power take-off assemblies utilizing a hydraulic connect-disconnect clutch.

An advantage of using a power take-off, is the fact that it can be connected to a live gear within the main transmission even while the output shaft of the main transmission is in a neutral condition. A problem is created however if the power take-off is being utilized during a ratio change in the main transmission, for when a shift is attempted, the load on the power take-off assembly is imposed on the live gear in the main transmission, interrupting the synchronized operation of the transmission gears, with the result that with many types of transmissions it is difficult to shift gears while the power take-off assembly is being used.

It is therefore an object of this invention to provide a power take-off assembly with a connect-disconnect clutch that facilitates shifting of the main transmission while the power take-off is in use.

Another object of this invention is to provide a power take-off assembly capable of high-speed operation.

Yet another object of this invention is to provide a power take-off assembly with the capabilities of providing a right or lefthand drive.

Still another object of this invention is to provide a power take-off assembly capable of many reduction ratios with only minor changes in components.

A further object is to provide a fully pressure lubricated system to allow for the high-speed operation of the power take-off assembly.

Figure 1:
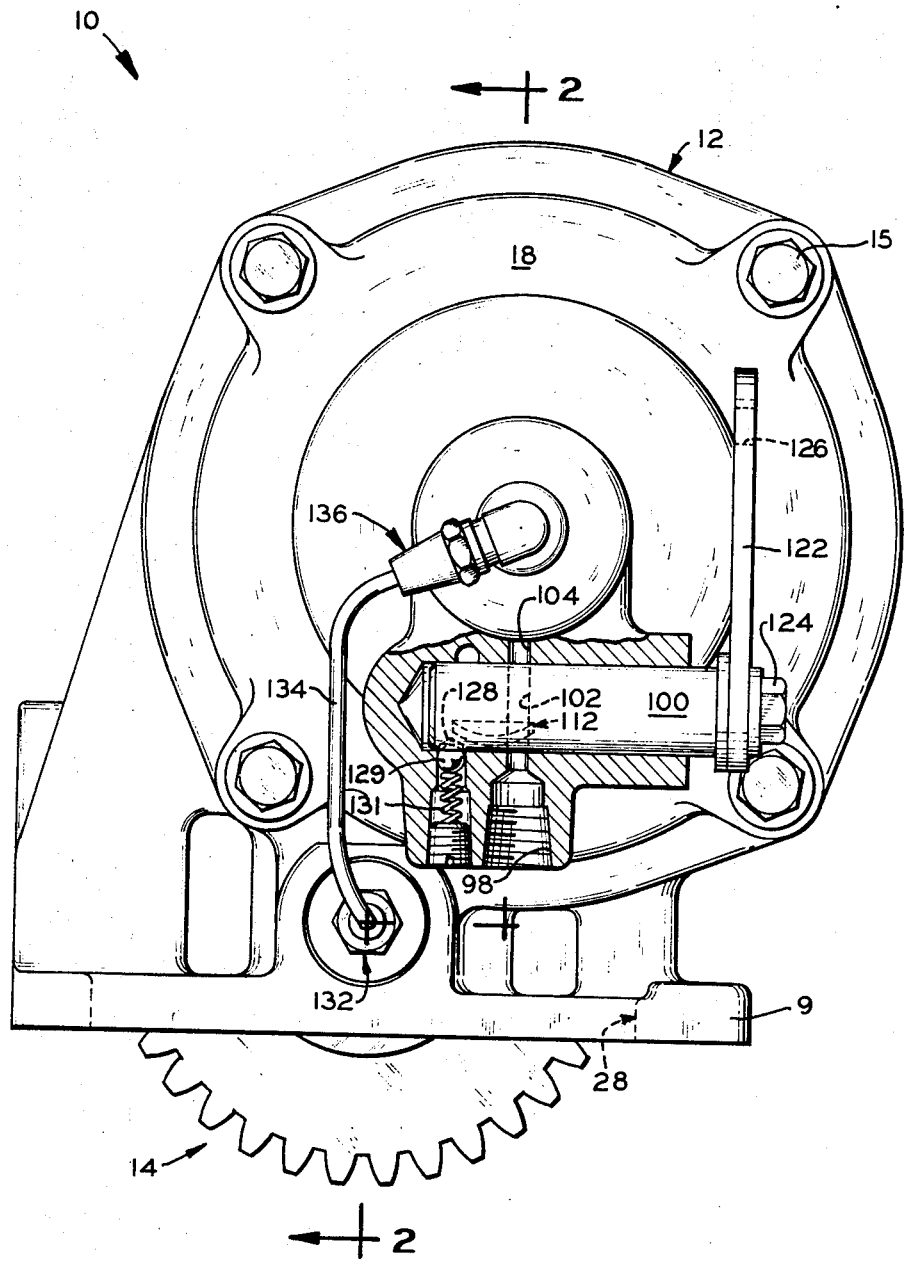
Figure 2:
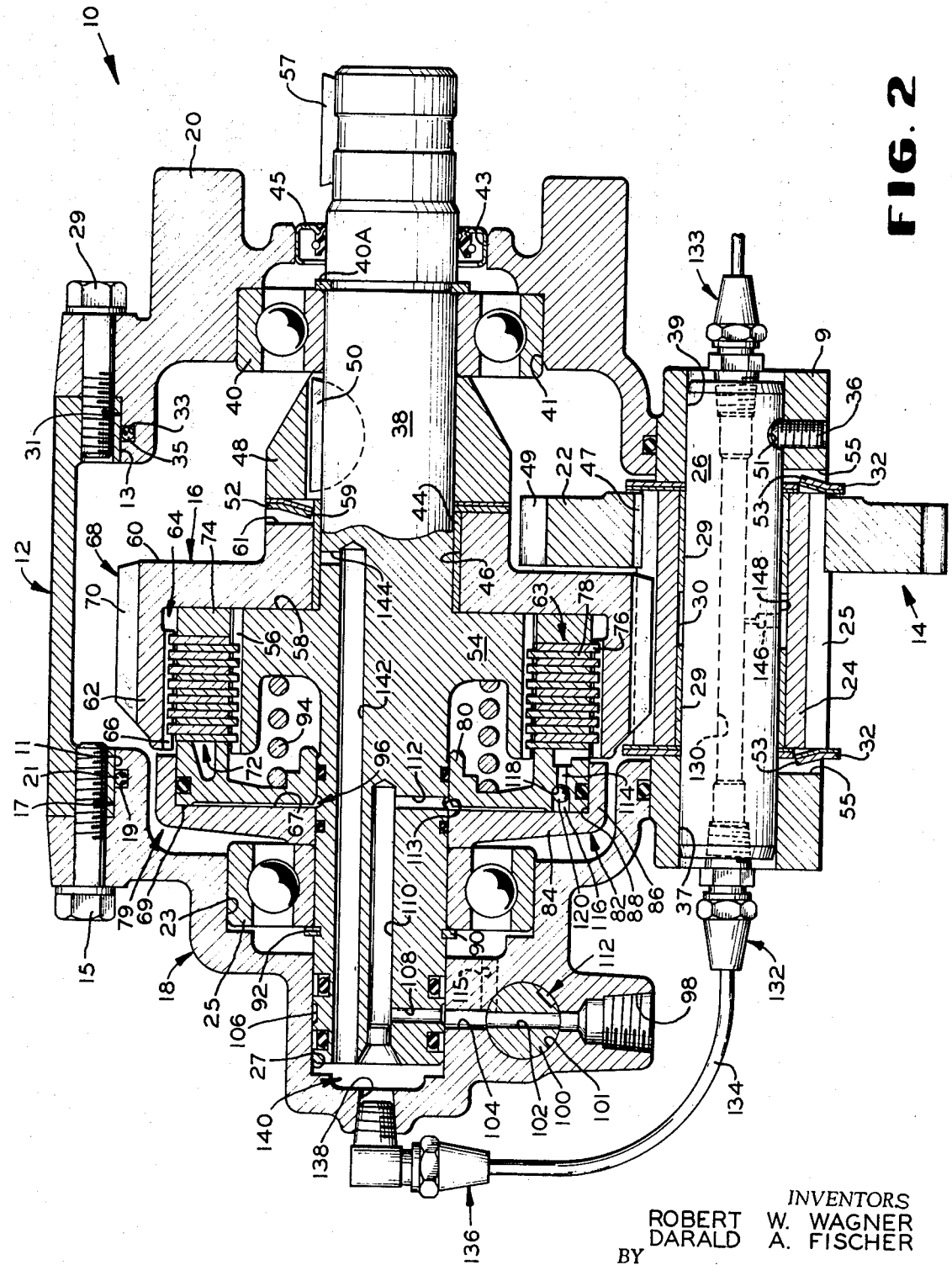

These and further objects will become apparent from the following specification when taken in connection with the attached drawings, in which;

FIG. 1, is an end view of a power take-off assembly partially in section to show the control valve, and FIG. 2 is a longitudinal cross-sectional view of the power take-off taken generally along line 2—2 in FIG. 1.

Referring to the drawings, a power take-off is shown generally at 10, and includes a hollow housing 12 of generally annular shape with a flanged portion 9. The housing has coaxial bores 11 and 13 at opposite ends of the housing, a generally rectangular-shaped opening 28 in the flanged portion 9, and coaxial bores 37 and 39 in the flanged portion 9 and parallel to bores 11 and 13. A first end closure 18 is affixed to the leftward end of the housing 12, as seen in FIG. 2, by means of a plurality of threaded fasteners 15. The end closure 18 has a cylindrical portion 17 that is received within the bore 11, and the cylindrical portion 17 has a circumferentially extending groove 19 within which is received an O-ring 21 for sealing purposes. The end closure 18 also has two bores 23 and 27 concentric with the cylindrical portion 17; the bore 23 receiving an anti-friction bearing 25, and the bore 27 forming a pocket within the end closure 18 receiving the left end of an output shaft 38.

A second end closure 20 is affixed to the rightward end of the housing 12 by means of a plurality of threaded fasteners 29, and has a cylindrical portion 31 that is received within the bore 13. A circumferentially extending groove 33 on the cylindrical portion 31 receives an O-ring 35 for sealing between the housing 12 and end closure 20. Within the end closure 20 are bores 41 and 43 which are concentric with the cylindrical portion 31 and are coaxial with bores 23 and 27 in end closure 18. The bore 41 receives an anti-friction bearing 40, and the bore 43 receives a sealing element 45 to seal between the bore 43 and the output shaft 38 which extends to the right through the end closure 20.

A drive train is shown as comprising an idler gear means 14, which is made up of a gear sleeve 24 having a smooth cylindrical bore 30 and gear teeth 25 on the outer peripheral surface, and a gear disk 22 having an inner peripheral surface with gear teeth 47 thereon and an outer peripheral surface with gear teeth 49 thereon. The gear teeth 47 of the gear disk are meshed with the gear teeth 25 of the gear sleeve in a splined relationship to form the idler gear means 14.

A stationary idler shaft 26 is supported in the bores 37 and 39 of the flanged portion 9 of the power take-off housing 12. A set screw 36 in the flanged portion 9 engages a transverse groove 51 at the rightward end of the idler shaft to prevent the idler shaft from moving relative to the housing 12. A pair of annular thrust washers 32, 32 are carried by the idler shaft 26 and have axially extending tangs 53, 53 that engage the housing 12 in grooves 55, 55 to prevent rotation of the thrust washers relative to the housing. The idler gear means 14 is disposed between the thrust washers 32, 32 and is rotatably supported by the idler shaft 26 by means of a pair of bushings 29, 29 pressed into the cylindrical bore 30 of the idler shaft. The thrust washers prevent the idler gear means from rubbing the housing while the idler gear means is rotating. The idler gear means 14 extends through the rectangular-shaped opening 28 in a manner to allow it to be meshed with a gear in the main transmission (not shown).

The output shaft 38 is rotatably supported by the anti-friction bearings 25 and 40, and has its leftward end journaled within the bore 27 of the end closure 18 and its rightward end extending through bore 43 in the end closure 20. An enlarged portion 54 with spline teeth 56 on the outer periphery, is on the output shaft intermediate the two bearings 25 and 40. The rightward end surface 58 of the enlarged portion 54 is perpendicular to the axis of the output shaft 38 to provide a locating surface. At the extreme rightward end of the output shaft 38 is shown a woodruff key 57 for engaging the implement to be driven (not shown) in a torque transferring relationship. Although not shown, the woodruff key 57 can be replaced by cutting a spline on the end of the shaft, or by making the end of the shaft a polygon in shape.

A gear 16, constantly in mesh with the idler gear means 14, is rotatably mounted on the output shaft 38 adjacent the rightward end surface 58 of the enlarged portion 54. A low friction bushing 44 is pressed into a bore 46 in the hub of the gear 16 to support it on the output shaft. The gear 16 includes a portion 60 extending radially from the hub thereof and an axially leftward extending annular flange 62 connected to the radially extending portion. The flange 62 has an outer peripheral surface 68 with gear teeth 70 thereon, and an inner peripheral surface 64 with spline teeth 66 thereon. An annular shaped channel 72 is defined between the output shaft 38 and the gear 16 by the enlarged portion 54 on the output shaft, the inner periphery 64 of the axially extending flange 62, and the radially extending portion 60 makes the innermost end of the channel.

An axial spacer sleeve 48 that is drivingly connected to the output shaft 38 by means of a woodruff key 50, is located between the gear 16 and the anti-friction bearing 50, and serves to locate the gear 16 on the output shaft. A snap ring 40A is secured in a groove in the shaft 38 immediately to the right of the bearing 50 to inhibit leftward movement of the shaft. An annular thrust washer 52 is carried by the output shaft 38 and is positioned between the spacer sleeve 48 and the gear 16. A tang extension 59 on the thrust washer 52 engages a groove 61 in the gear 16 so that the thrust washer rotates with the gear. The location of the spacer sleeve 48, which is rotating with the output shaft, prevents any relative rotation between the inner race of the anti-friction bearing 40 and parts adjacent to the bearing.

Received within the channel 72 is an annular thrust member 74 abuttingly located against the left face of the radially extending portion 60 of gear 16. The thrust member 74 serves as an extension of portion 60 and is formed separately therefrom to facilitate machining of the splines 66. Located to the left of the thrust member 74 is a clutch means 63 comprised of a series of interleaved clutch disks 76 and 78. The clutch disks 76 have external peripheral splines that are engaged with splines 66 of gear 16, and the clutch disks 78 have internal peripheral splines engaging the splines 56 on the enlarged portion 54 of output shaft 38. By placing an externally splined clutch disk 76 at the innermost end of the channel 72, there will be no relative rotation between the clutch disk 76 and the gear 16, thereby causing the thrust member 74 to rotate with the gear 16.

To the left of the clutch means 63 is a thrust means 79, more particularly, an annular piston 80 is slidably mounted on the output shaft 38. A cup-shaped pressure cylinder 82 is pressed onto the output shaft 38, and is fixed against axially leftward movement upon the shaft by the anti-friction bearing 25 abutting a snap ring 90 to the left of the bearing in a circumferentially extending groove 92 in the periphery of the output shaft. The pressure cylinder 82 has a radially extending annular portion 84, having an inner or rightwardly facing wall 67, and an axially rightward extending annular flange 86 having an inner peripheral surface 88; the flange 86 being attached to the radially extending portion. The piston 80 is received within the pressure cylinder 82 and bears against the inner peripheral surface 88 of the cylinder and the outer peripheral surface of output shaft 38 while being disposed immediately to the right of the inner wall 67. An annular gap 96 appears between the inner wall 67 and the piston 80 because of an axially leftwardly extending annular projection 69 at the outermost radial edge of the piston which engages the wall 67; this gap providing space for the initial entry of a pressure fluid between the piston and cylinder. A helical compression spring 94 is positioned between the piston 80 and the enlarged portion 54 of the output shaft 38 to bias the piston in a leftward direction at all times.

To energize the thrust means 79 and thereby engage the clutch means 63, an external source of hydraulic fluid (not shown) is suitably supplied to a pressure inlet 98 in the end closure 18. An opening 104 connects the pressure inlet to the bore 27 in the end closure 18. The opening 104 is aligned with a circumferentially extending groove 106 in the outer peripheral surface of the output shaft 38, and the circumferentially extending groove communicates with a radially disposed opening 108 in the shaft 38, which opening 108, in turn is connected to an axially extending opening 110 in the output shaft. The opening 110, extends rightwardly in the shaft until it is to the right of the gap 96 between the piston 80 and the pressure cylinder 82. A radially disposed opening 112 connects the rightward end of the axially extending opening 110 to a circumferentially extending groove 113 in the outer peripheral surface of the output shaft 38. The groove 113 is in alignment with the gap 96 in a manner that when pressurized fluid is admitted to the system, the fluid can enter the gap 96 causing the piston 80 to slide to the right to compress the clutch means 63 into torque transferring engagement.

A rotary valve stem 100 is located in a bore 101 in the end closure 18; the bore 101 interrupting the opening 104. A diametrically extending hole 102 in the valve stem 100 is positioned in a manner that upon rotation of the valve stem, the hole 102 can either close off the opening 104 or open it to allow fluid flow. When the opening 104 and the hole 102 are aligned, the fluid flow is allowed to enter the system to cause engagement of the clutch means. Referring to FIG. 2, the valve stem 100 is shown in the clutch engage position with opening 102 aligned with opening 104, however to more clearly show the construction of the clutch means 63 and thrust means 79 the clutch is shown in the disengaged position.

To disconnect the clutch means, the fluid is removed from the system by rotating the valve stem 100 until an axially extending slot 112 is aligned with the opening 104, thereby cutting off the pressure supply to the system and providing a means for the fluid in the system to return to the fluid in the housing 12 by means of an opening 115 in the end closure 18. The fluid moves through the opening 104, along the slot 112 and then through the opening 115 which is in communication with the interior of the housing 12. The pressure supply for the power take-off is pumped from the sump of the main transmission, and when the fluid from the system empties into the housing 12, it returns to the sump of the main transmission through the rectangular opening 28 which is in cooperative alignment with a similar opening (not shown) in the transmission housing.

Adjacent the outer periphery of the piston 80 is an axially disposed pressure relief means comprised of a first cylindrical opening 114 open to the right side of the piston 80, a second cylindrical opening 116 of a diameter larger than the first, the two being connected by means of a bevel surface 118, and a ball 120; the ball being slightly smaller in diameter than the opening 116 while larger in diameter than the opening 114 and being received within the opening 116. The ball 120 moves to the right and seats upon the beveled surface 118 to act as a check valve when the chamber 96 is pressurized, but as the pressure is removed from the chamber 96, the centrifugal force on the ball from the rotation of the piston 80 will cause the ball to move along the beveled surface 118 and become unseated thereby allowing hydraulic fluid trapped in the outer periphery of the chamber 96 by centrifugal force to escape and permitting the spring 94 to return the piston the left and release the clutch means from engagement.

In FIG. 1, the rotary valve stem 100 is shown with a lever control arm 122 affixed to the right end of the valve stem by means of a bolt 124. At the upper end of the lever arm 122 is an opening 126 to which the controls from the vehicle cab are attached to operate the valve. A detent 128 is drilled radially inward on the valve stem 100 to a depth great enough to accept slightly less than one-half of a poppet ball 129 which is preloaded in the direction of the stem by a helical compression spring 131. The detent locates the valve stem in a position wherein the opening 102 is aligned with the opening 104, and a second detent (not shown), also cooperable with the ball 129, aligns the slot 112 with the opening 115.

Means are provided to lubricate the power take-off. More particularly, a centrally located hole 130 is drilled in the stationary idler shaft 26, and lubricating fluid from an external source is fed into a hydraulic fitting 133 in the rightward end of the hole 130, through the hole 130 into a second hydraulic fitting 132 in the leftward end of the hole 130, from there through a hydraulic hose 134 and to a third hydraulic fitting 136 mounted in an opening 138 in the end closure 18. The opening 138 communicates with a gap 140 between the leftward end of the output shaft 38 and the end closure 18. A hole 142 in the output shaft 38 also communicates with the gap 140 and extends axially to the right and parallel to the hole 110 until it reaches under the bushing 44. A radially disposed hole 144 runs from the hole 142 to the shaft periphery, through which lubricant is supplied to the bushing. Halfway along the length of the idler shaft 26 is located a radially disposed hole 146 connecting the hole 130 with the outer periphery 148 of the idler shaft 26 thereby providing an access means for the lubricating fluid to reach the space between the bushings 29, 29 that are within the gear sleeve 24 and thereby lubricating both bushings.

What is claimed is:

1. A power take-off assembly for use with a transmission which has a transmission housing and gearing within the housing and an opening in the transmission housing giving access to the gearing therein, said power take-off comprising; (a) a housing means having an opening and adapted to be secured to the transmission housing with the openings therein in cooperative relationship, (b) a drive train carried by said housing means and including an output shaft rotatably mounted in said housing means, a first gear means mounted for coaxial rotation relative to said output shaft and secured against axial movement relative thereto, a second gear means rotatably mounted in said housing means for rotation about an axis parallel to the axis of said output shaft and being in constant meshed relationship with said first gear means and adapted to be in a constant meshed relationship with a gear of the transmission through the cooperative openings when the housing means is secured to the transmission housing, (c) clutch means connected to said output shaft and said first gear means for selectively drivingly connecting and disconnecting said output shaft and said first gear means, said clutch means including a plurality of interleaved clutch disks some of which are connected to said output shaft for rotation therewith and others of which are connected to said first gear means for rotation therewith, a first thrust means at one axial end of said clutch disks and including said first gear means for resisting axial thrust, a second thrust means at the opposite axial end of said clutch disks from said first thrust means for imposing axial thrust in a first direction toward said first thrust means, said second thrust means including a pressure cylinder carried by said output shaft and rotatable therewith while being secured against axial movement relative thereto in a direction opposite said first direction, a piston carried by said output shaft and received within said pressure cylinder and axially movable relative thereto towards and away from said first thrust means, said piston and said pressure cylinder having a charging space therebetween, a pressure passage through said output shaft and confluent with said charging space for carrying pressure fluid to and away from said charging space, whereby upon application of pressure fluid in said pressure passage and said charging space said piston moves axially toward said disks, and means for moving said piston axially away from said first thrust means upon removal of said pressure fluid.

2. A power take-off assembly for use with a transmission which has a transmission housing, transmission shafts and gearing within the housing and an opening in the transmission housing giving access to the gearing therein, said power take-off comprising; (a) housing means having an opening and adapted to be secured to the transmission housing with the openings therein in cooperative relationship, (b) an output shaft rotatably mounted in said housing means parallel to the shafts in the transmission and having a peripherally splined portion axially intermediate the ends thereof, (c) a gear rotatably mounted on said output shaft adjacent said splined portion, said gear having a radially outward portion extending from said shaft and an axially extending flange connected to said radial portion, said axial extending flange overlying and spaced radially outwardly from said peripherally splined portion thereby defining an annularly shaped channel between said axially extending flange and said peripherally splined portion with the radially extending portion of said gear forming the axially inner end of said channel, said axially extending flange having gear teeth on the outer peripheral surface thereof and splined teeth on the inner peripheral surface thereof, (d) means maintaining said gear from moving axially relative to said output shaft, (e) at least a pair of clutch disks positioned within said channel with one of said disks being splined to said splined teeth of said gear and the other being splined to the peripherally splined portion of said output shaft, (f) a first thrust means including said gear for inhibiting axial movement of said clutch disks in a direction inwardly of said channel, (g) second thrust means positioned at the opposite axial side of said clutch disks from said first thrust means, said second thrust means including a pressure cylinder carried by said output shaft and rotaatble therewith and having open and closed opposed axial ends with said open end facing said annularly shaped channel, means preventing relative axial movement of said cylinder and said output shaft, a piston slidably mounted on said output shaft and received within said pressure cylinder, said closed end of said cylinder and said piston having a charging space therebetween and said piston being adapted to thrust upon said clutch disks upon being urged axially away from said closed end, a pressure supply and drain means through said output shaft and confluent with said charging space for carrying pressure fluid to and away from said charging space, whereby upon the supply of pressure fluid to said charging space said piston slides axially towards and presses said clutch disks against said first thrust means to drivingly connect said output shaft and said gear, and resilient means for returning said piston towards the closed end of said pressure cylinder and releasing said clutch disks upon removal of said pressure fluid for disconnecting said gear and output shaft from a driving relationship.

3. A power take-off assembly for use with a transmission which has a transmission housing, transmission shafts and gearing within the housing and an opening in the transmission housing giving access to the gearing therein, said power take-off comprising; (a) a housing means having an opening and adapted to be secured to the transmission housing with the openings therein in cooperative relationship, (b) a drive train carried by said housing means and including an output shaft rotatably mounted in said housing means parallel to the transmission shafts, a first gear means mounted in said housing means for coaxial rotation relative to said output shaft, a stationary idler shaft mounted in said housing means and parallel to said output shaft and the transmission shafts, a second gear means rotatably mounted in said housing means for rotation about said idler shaft and being in constant meshed engagement with said first gear means and the transmission gear, (c) clutch means connected to said output shaft and said first gear means for selectively drivingly connecting and disconnecting said output shaft and said first gear means, said clutch means including at least a pair of annular clutch disks with one of said clutch disks having an external periphery with spline teeth thereon and the other disk having an internal periphery with spline teeth thereon, a first splined connecting means on said output shaft to which the internally splined clutch disk is engaged, a second splined connecting means on said first gear means to which the externally splined clutch disk is engaged, (d) a first thrust means including said first gear means for inhibiting axial movement of said clutch disks in a direction toward said first gear means, (e) second thrust means positioned at the opposite axial side of said clutch disks from said first thrust means, said second thrust means including a pressure cylinder carried by said output shaft and rotatable therewith and having an open and a closed axial ends with said open end facing said clutch means, means preventing relative axial movement of said cylinder and said output shaft, a piston slidably mounted on said output shaft and received within said pressure cylinder, said closed end of said cylinder and said piston having a charging space therebetween and said piston being adapted to thrust upon said clutch disks upon being urged axially away from said closed end, a pressure supply and drain means through said output shaft and confluent with said charging space for carrying pressure fluid to and away from said charging space, whereby upon the supply of pressure fluid to said charging space said piston slides axially towards and presses said pair of clutch disk against said first thrust means to drivingly connect said output shaft to said first gear means, and resilient means for returning said piston toward the closed end of said pressure cylinder and releasing said clutch disk upon removal of said pressure fluid for disconnecting said gear and output shaft from a driving relationship.

4. A power take-off assembly according to claim 3 wherein said second gear means consists of a sleeve rotatably supported on said idler shaft, said sleeve having an outer periphery with gear teeth thereon, said gear teeth being in constant mesh with said first gear means, a gear disk having an inner peripheral surface with gear teeth thereon and an outer peripheral surface with gear teeth thereon, said inner peripheral surface of said gear disk connected to said sleeve by said gear teeth and rotatable therewith as a unit, and said gear teeth on said outer periphery of said gear disk being in constant mesh with the gear of the transmission.

5. A power take-off assembly according to claim 3 wherein said resilient means consists of a helical compression spring surrounding the periphery of said output shaft and operable between said output shaft and said piston to provide a biasing action on the piston against the action of said pressure fluid whereby upon removal of said pressure fluid the said spring forces the piston to slide axially to release the clutch from engagement.

References Cited

UNITED STATES PATENTS

| 2,736,202 | 2/1956 | Wagner. |
| 3,011,608 | 12/1961 | Hansen. |
| 3,021,932 | 2/1962 | Becknell. |
| 3,038,575 | 6/1962 | Hansen. |
| 3,041,884 | 7/1962 | Elfes _____ 74—15.86 |
| 3,048,248 | 8/1962 | Becknell. |
| 3,291,273 | 12/1966 | Hansen. |

FOREIGN PATENTS 359,935  3/1962  Switzerland.

LEONARD H. GERIN, Primary Examiner